Oct. 6, 1953  D. C. LUTZ  2,654,158
STEEL SQUARE CALCULATOR
Filed May 2, 1950  3 Sheets-Sheet 1

INVENTOR.
DONALD C. LUTZ
BY Victor J. Evans & Co.
ATTORNEYS

Oct. 6, 1953 — D. C. LUTZ — 2,654,158
STEEL SQUARE CALCULATOR
Filed May 2, 1950 — 3 Sheets-Sheet 3

INVENTOR.
DONALD C. LUTZ
BY Victor J. Evans & Co.
ATTORNEYS

Patented Oct. 6, 1953

2,654,158

UNITED STATES PATENT OFFICE 2,654,158

STEEL SQUARE CALCULATOR

Donald Clyde Lutz, Hollywood, Calif., assignor of one-half to Carrie Gros Lutz, Hollywood, Calif.

Application May 2, 1950, Serial No. 159,456

5 Claims. (Cl. 33—215)

This invention relates to a calculating instrument, and more particularly to an instrument for use by carpenters, engineers and other persons in the construction field.

The object of the invention is to provide an instrument or tool for use in automatically determining the correct figures or relative values to be used on each of the two limbs of a carpenter's steel square in designing, calculating, laying out, or fabricating common rafters, hip rafters, jack rafters, trusses, angular braces, and other roof members.

Another object of the invention is to provide an instrument or tool which is adapted to be used for determining the angle of inclination or declination of a straight line or plane, or for establishing a true horizontal or vertical line or plane surface, or other such operation which necessitates leveling or plumbing a line or plane surface.

Still another object of the invention is to provide a steel square calculating device which is adapted to be used in any mechanical, structural or engineering operation where the standard steel square is utilized in calculating, laying out, designing, or fabricating angular roof members, bridge members, stairways, masonry, or other structural members, and wherein the device of the present invention can also be used for automatically determining the angle of inclination or declination of any straight line or plane.

A further object of the invention is to provide a calculating device which is extremely simple and inexpensive to manufacture.

Other objects and advantages will be apparent during the course of the following description.

In the accompanying drawings forming a part of this application, and in which like numerals are used to designate like parts throughout the same:

Figure 5 is a sectional view taken on the line 5—5 of Figure 1;

Figure 6 is a sectional view taken on the line 6—6 of Figure 1;

Figure 7 is a front elevational view illustrating the calculating device of the present invention positioned on a piece of pipe and being used as a level, with parts broken away;

Figure 8 is a view similar to Figure 2, but illustrating a modified form of the calculating device.

Figure 1:
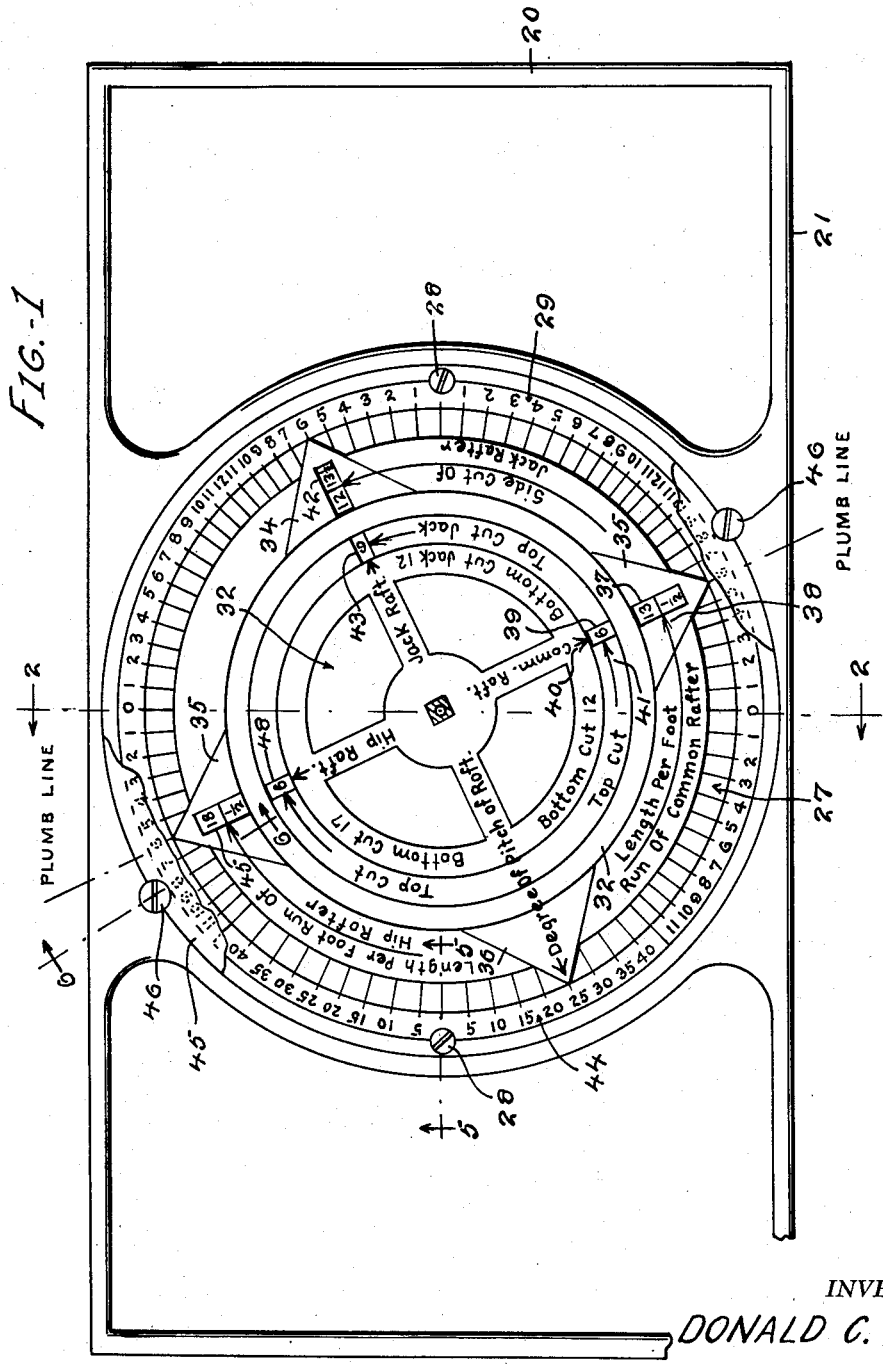
Figure 1 is a front elevational view of the steel square calculating device of the present invention, the plumb line being indicated by broken lines.

Figure 9 discloses details of the way the pendulum is mounted on the shaft.

Referring in detail to Figures 1 through 7 of the drawings, the numeral 20 designates a calculating device which includes a rectangular frame 21 that may be fabricated of any suitable material. Connected to the frame 21 by any suitable means is a housing or body 22 which is substantially circular in shape. The housing 22 has its inner surface cut away to define an interior annular shoulder 23, and the housing also further includes a second pair of annular shoulders 24 and 25, the shoulders 24 and 25 being arranged on opposite sides of the shoulder 23 for a purpose to be later described.

Figure 2:
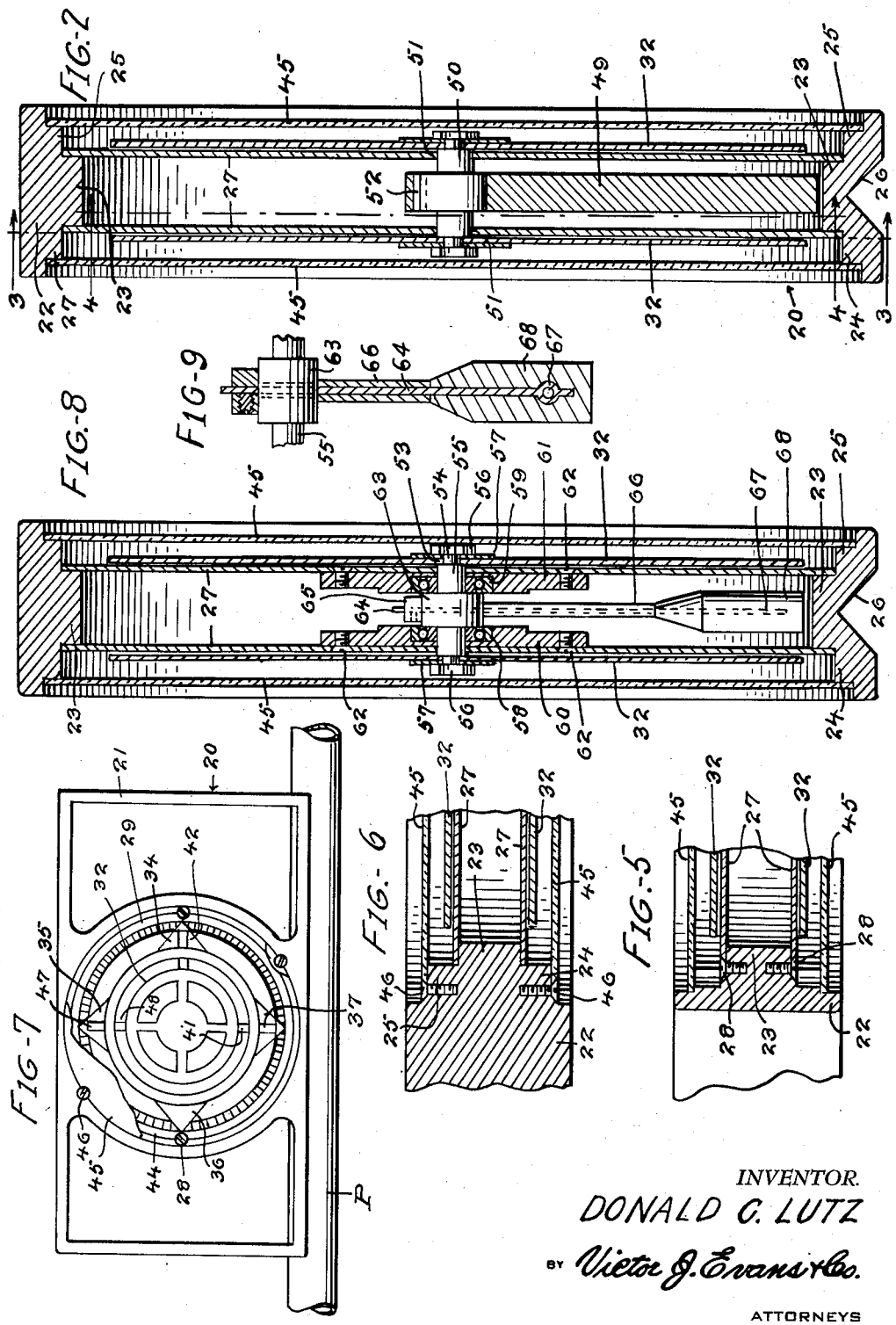
Figure 2 is an enlarged sectional view taken on the line 2—2 of Figure 1.

The bottom or base of the housing 22 is provided with a V-shaped groove or recess 26, Figure 2, so that when the calculating device is being used as a leveling instrument, it can be snugly and conveniently positioned on a member, such as pipe P, Figure 7.

Arranged in spaced, parallel relation within the housing 22 is a pair of stationary, inner dials 27, the dials 27 each having indicia or markings printed or otherwise affixed to their outer surfaces. These dials 27 abut opposite sides of the shoulder 23 and are secured thereto by suitable securing elements, such as screws 28.

Figure 3:
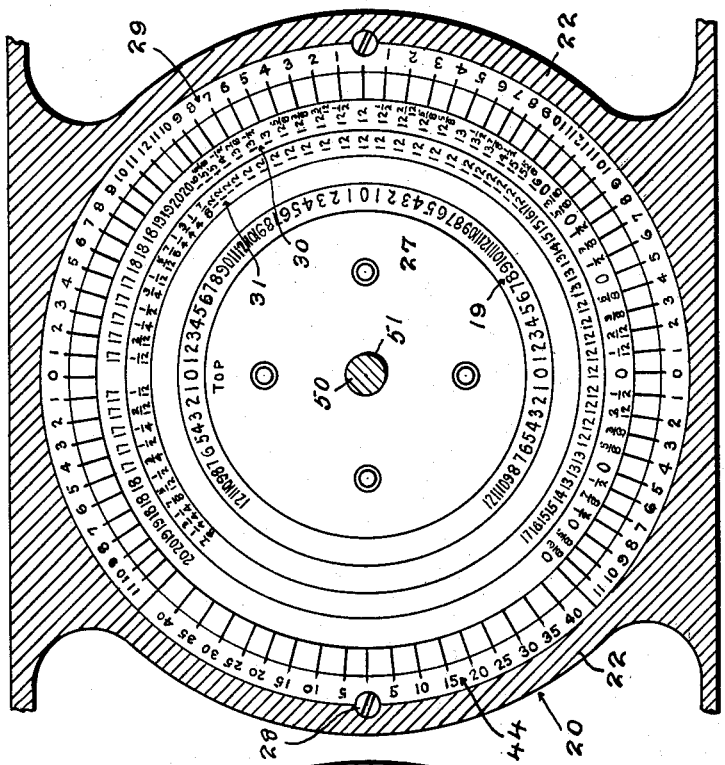
Figure 3 is a sectional view taken on the line 3—3 of Figure 2.
Figure 4:
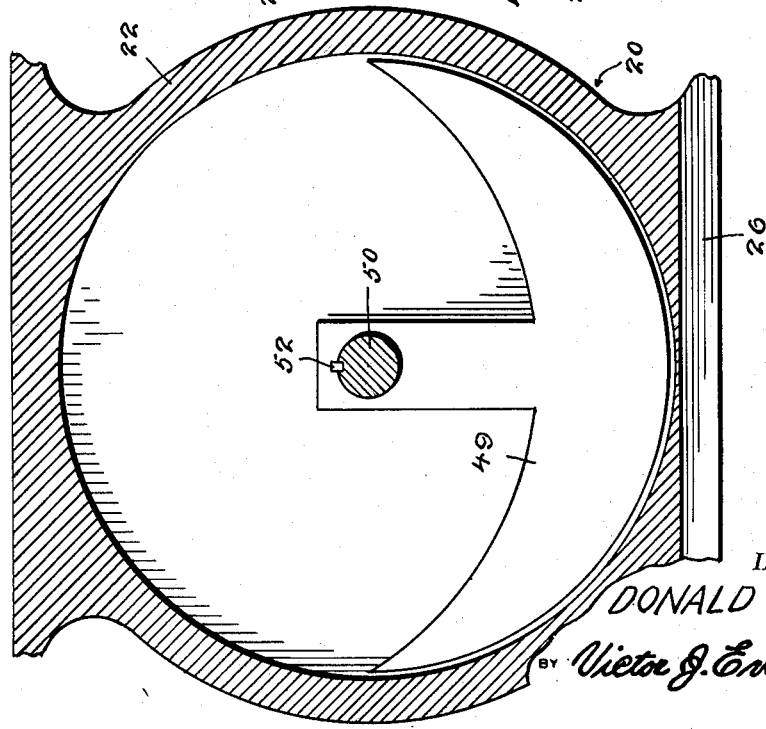
Figure 4 is a sectional view taken on the line 4—4 of Figure 2.

Referring to Figure 3 of the drawings, there is shown a view illustrating the arrangement of the numbers or indicia on each of the inner dials 27. The purpose of providing a pair of the dials 27 is so that the instrument of the present invention can be used regardless of what direction the instrument is being viewed from by the user.

As each dial 27 has the same construction and arrangement of indicia thereon, a description of one will suffice for both. Each dial 27 includes an outer series of graduations 29 which includes the numbers 1, 2, 3, 4, 5, etc., to 12. These numbers represent the number of twelfths to which the natural tangents are equal. Twelve is taken as the base because there are 12 inches to the foot, and the vertical rise in inches per 12 inches of horizontal run is the basis for figuring all construction slopes and angles including those used in structural and carpenter work. Since 12 is the horizontal base and the figures 1, 2, 3, 4, 5, etc., represent the vertical rises or the length of the vertical leg of the triangle, then the vertical rise divided by the horizontal base is the natural tangent of the angle described between the horizontal base and the hypotenuse of the right triangle. The hypotenuse of this right triangle represents the slanting or sloping line or member, such as a rafter or angular brace. The dial 27 is also provided with two intermediate series of graduations 30 and 31, and these two middle series of graduations 30 and 31 on the dials 27 represent the length of the hypotenuse of this right triangle, and value is composed of a whole number and a fraction, such as 12 and $\frac{1}{12}$, 12 and $\frac{2}{12}$, etc. Each of these mixed numbers coincides with a numeral on the outer series of graduations 29 on the inner calibrated dial 27, and represents the length of the hypotenuse of a right triangle with a horizontal base of 12 and a rise or vertical leg equivalent to the number directly below the mixed number, such as 1, 2, 3, etc. Consequenly, for a given vertical rise with a horizontal base of 12, the hypotenuse of the triangle is automatically computed and the length of rafter or other sloping or slanting member per foot of horizontal run is automatically computed in such a manner that the steel square settings for the top cuts of the various kinds of rafters are automatically given directly in a radial line, with the vertical rise and the slant length of the rafter being figured. The function of the inner calibrated dials 27 will be explained in detail later on in the operation of the steel square calculating device as a unit.

The instrument of the present invention further includes a pair of movable or rotatably mounted, calibrated outer dials 32 each of which has suitable indicia printed or otherwise affixed to its outer surface. Each of the outer dials 32 has the same construction, and each is provided with four projecting portions or pointers 33, 34, 35 and 36, these pointers coinciding with the zeros on the outer dial 27 when the instrument is in normal or level position.

As each outer dial 32 has the same construction, a description of one will suffice for both. Arranged in the outer dial 32 above the lower pointer 35 is an aperture 37 which is indicated by the arrow 38 with the notation "Length per foot run of common rafter." Arranged in the dial 32 immediately above the aperture 37 is another smaller aperture 39 to which two arrows 40 and 41 are leading, with the notations "Common rafter" and "Top cut." Immediately above the notation "Top cut" is another notation "Bottom cut 12." All of the above notations refer to common rafters.

Arranged in the right pointer 34 of the outer dial 32 is a large aperture 42 which refers to the side cut of jack rafters, and there is also provided a smaller aperture 43 which indicates the bottom of jack rafters of 12. The top pointer 35 has apertures 47 and 48 for giving the information necessary for fabricating hip rafters. The left pointer 36 indicates the pitch of the slope on which the steel square calculator of the present invention is resting, and the left pointer 36 coacts with the portion 44 of the inner dial 27, the portion 44 being graduated directly in degrees. The operation of the outer calibrated, rotating dial 32 will be explained in detail later in this application.

The instrument of the present invention further includes a pair of spaced, parallel faces or plates 45 which are made of a suitable transparent plastic or glass, the plates 45 abutting the shoulders 24 and 25 and being secured thereto by suitable securing elements, such as screws 46. The glass plates 45 enable the user to readily observe or read the various markings or indicia on the instrument, and these plates also serve to prevent damage or contamination of the inner working parts of the instrument.

Referring to Figure 2 of the drawings, it will be noted that there is provided a pendulum 49 which is fastened to a main bearing shaft 50 by a key 52, and the shaft 50 is free to move about its axis in openings 51 arranged in dials 27. The main bearing shaft 50 is in turn rigidly fastened to the outer calibrated rotating dials 32. By the above arrangement, the pendulum 49 will always be vertical and perpendicular to the horizontal plane, and the outer, calibrated, rotating dials 32 will remain in the same position with respect to the pendulum 49. Therefore, as the body of the steel square calculator and the inner, calibrated dials 27 are turned about the axis of the main bearing shaft 50, the slope or inclination of the base of the body or housing 22 will be automatically indicated by the pointers. The upper pointer 35, lower pointer 33 and right-hand pointer 34 will indicate the vertical rise in inches per foot of horizontal run, and the left-hand pointer 36 will indicate the slope or inclination in degrees. The value of this feature of the steel square calculator lies in the fact that the base of the body 22 may be placed on any sloping member and the degree in slope or the vertical rise in inches per foot of horizontal run is indicated instantly and automatically. By employing this feature, when any roof framing member is in place, the remainder of the roof framing members may be cut without any calculation. The base of the body 22 is merely placed along the sloping member which is in place and the steel square settings for the cuts of the various other members are indicated automatically in the proper apertures.

Referring in detail to Figure 8 of the drawings, there is shown a slightly modified form of the invention which is adapted to be used in the same manner as the previously-described instrument of Figures 1 through 7. Thus, the instrument of Figure 8 includes the body or housing 22, the transparent plate 45 and the same previously-described, inner dials 27 and outer dials 32. However, a different pendulum construction is employed in the instrument of Figure 8. The outer, calibrated, rotating dials 32 are each fitted with a square hole 53 which fits over a square surface 54 of a main bearing shaft 55, and the dials 32 are fastened rigidly to shafts 55 by means of nuts 56 which are tightened down on star washers 57. Main bearing shaft 55 is supported in two ball bearing sets 58 and 59 which are held in place by ball bearing retainer housings 60 and 61. Ball bearing retainer housing 60 is fastened to the dial 27 by means of cap screws 62, and ball bearing retainer housing 61 is fastened to the other dial 27 by means of similar screws 62. Movement of the main bearing shaft 55 is prevented in a forward or reverse direction by spacing collar 63.

A hole is drilled through main bearing shaft 55 in such a manner that the hole is vertical when the outer, calibrated, rotating dials 32 are in the normal or level position. A piano wire 64 is passed through this hole and is secured in the correct position by means of pendulum adjustment collar 65. A pendulum wire tube 66 is provided for preventing the pendulum wire 64 from sliding in the hole in the main bearing shaft 55. On the bottom of the piano wire 64 is fastened a pin 67 around which is cast a lead pendulum weight 68, the pendulum weight 68 serving the same purpose as the previously-described pendulum 49.

The tube 66 interposed on the wire 64 between the shaft 55 and weight 68 retains the weight substantially rigid with the shaft. Furthermore the tube prevents the wire from sliding in the hole in the shaft during erratic movement of the calculating device. In other words the tube prevents the weight from moving erratically in the calculating device when it is moved except when using the device in the prescribed manner.

The operation of the steel square calculator is as follows: The vertical rise in inches per foot of horizontal run is determined from the design of the structure which is to be built, and the body of the instrument of the present invention is merely placed along the sloping member which is in place, and the steel square settings for the cuts of the various other members are indicated automatically in the proper apertures. It is to be understood that the outer series of graduations in all of the quadrants on the dials 27, except those hereinbefore noted, indicate the vertical rise in inches on the slope per foot of horizontal run, and the left pointer 36 indicates the slope directly in degrees. With the pointers in their adjusted positions, the other values are read directly in their respective apertures. The values indicated in the larger apertures 47 and 37 in the top and bottom pointers are self-explanatory. The values indicated in the other apertures 48 and 39 are the correct settings of the steel square to perform certain operations in connection with structural and other engineering work. The steel square setting for the bottom cut of a common rafter or a jack rafter is 12, and the setting for the bottom cut of a hip rafter is 17. The figures above referred to are the numbers on the edge of the blade of the steel square, which numbers are placed in the correct position on the edge of the board or other member to be cut. The steel square settings for the top cuts of the various types of rafters are noted in the smaller apertures nearer the centers of the dials 32. These settings are the correct figures on the tongues or other arm of the steel square, which figures are placed in the correct position on the edge of the board or other member to be cut.

The larger aperture 42 in the right-hand pointer 34 indicates the correct steel square setting for the side cut of jack rafters, and this figure on the tongue of the steel square is to be placed in the correct position on the board or other member when the figure 12 of the blade of the steel square on the other arm is placed on the same edge of the board. In the above manner, any roof framing member may be cut accurately without calculations or knowledge of the operation of the steel square, if only the vertical rise per foot of horizontal run and the length of the horizontal run are known. The inner series of numbers or graduations 19 on the stationary dials 27 are the numbers that are viewed or seen through the small apertures in the dials 32 when the instrument is being used.

In addition to indicating automatically the steel square settings for roof framing members, the steel square calculator may also be used as a level or plumb in place of the conventional spirit level, and the particular advantage of this type of level is that it may be used upside down on ceilings or other overhead surfaces, an operation which is impossible with the conventional spirit level. The steel square calculator may further be used where it is desired to maintain a definite slope or inclination in any kind of construction work instead of using a chalk line or other equally unsatisfactory means. This feature is particularly valuable in construction masonry, roads, railroads, pipe lines, canals, grades and the like. The steel square calculator of the present invention may also be used as an aid in surveying and calculating elevations, and the calculating device is also adapted to be used for ascertaining areas of roofs and other sloping surfaces.

I claim:

1. In a device of the class described, a body, an inner dial provided with indicia thereon secured to said body, an outer rotary dial provided with a plurality of spaced pointers and apertures for coaction with the indicia on said inner dial, and means for causing rotation of said outer dial relative to said inner dial, said means comprising a shaft connected to said outer dial, a wire having its upper end connected to said shaft, a pendulum connected to the lower end of said wire and a tube about the wire between the shaft and pendulum to maintain the pendulum substantially rigid with the shaft.

2. In a device of the class described, a body, an inner dial provided with indicia thereon secured to said body, an outer rotary dial provided with a plurality of spaced pointers and apertures for coaction with the indicia on said inner dial, and means for causing rotation of said outer dial relative to said inner dial, said means comprising a shaft connected to said outer dial, a pendulum connected to said shaft, a wire having its upper end connected to said shaft, a tube about the wire between the shaft and pendulum to maintain said pendulum in substantially rigid relation to said shaft, and a transparent plate spaced from said outer dial and secured to said body.

3. In a device of the class described, a body, an inner dial provided with indicia thereon secured to said body, an outer rotary dial provided with a plurality of spaced pointers and apertures for coaction with the indicia on said inner dial, and means for causing rotation of said outer dial relative to said inner dial, said means comprising a shaft connected to said outer dial, a pendulum connected to said shaft, a wire having its upper end connected to said shaft, a tube about the wire between the shaft and pendulum to maintain said pendulum substantially rigid with the shaft, and a transparent plate spaced from said outer dial and secured to said body, there being a V-shaped groove arranged in the bottom of said body.

4. In a calculating instrument, a body, there being an annular shoulder arranged interiorly of said body, a pair of spaced parallel inner dials provided with indicia therein abutting said shoulder and secured thereto, a pair of outer dials movably mounted with respect to said inner dials, said outer dials being each provided with a plurality of apertures, pointers and notations thereon, a pair of spaced parallel transparent plates arranged on opposite sides of said outer dials and secured to said body, a shaft extending rotatably through said inner dials and having its ends connected to said pair of outer dials, a pendulum positioned between said pair of inner dials and operatively connected to said shaft, a wire having its upper end connected to said shaft and a tube about the wire between the shaft and pendulum to maintain said pendulum substantially rigid with the shaft.

5. The apparatus as described in claim 4, wherein said body is provided with a V-shaped groove in its bottom.

DONALD CLYDE LUTZ.

References Cited in the file of this patent

UNITED STATES PATENTS

| Number | Name | Date |
|---|---|---|
| 573,211 | Deck | Dec. 15, 1896 |
| 924,058 | Graves | June 8, 1909 |
| 1,122,349 | Wyatt | Dec. 29, 1914 |
| 1,498,631 | Korlick | June 24, 1924 |
| 1,592,532 | Martin | July 13, 1926 |
| 1,715,270 | Bassett | May 28, 1929 |
| 1,732,335 | Iverson | Oct. 22, 1929 |
| 1,962,045 | Walton | June 5, 1934 |
| 2,022,452 | Aegerter | Nov. 26, 1935 |